United States Patent [19]
Danell

[11] 4,009,366
[45] Feb. 22, 1977

[54] THERMAL PULSE TYPE HEATER AND VALVE THEREFORE

[75] Inventor: Russell D. Danell, Winnipeg, Canada

[73] Assignee: James B. Carter Limited, Winnipeg, Canada

[22] Filed: Dec. 8, 1975

[21] Appl. No.: 638,376

Related U.S. Application Data

[63] Continuation-in-part of Ser. No. 608,876, Aug. 29, 1975, abandoned.

[52] U.S. Cl. .............................. 219/208; 137/856
[51] Int. Cl.$^2$ ................. F02N 17/04; F16K 15/14
[58] Field of Search ............... 219/208; 137/525.3, 137/525.5, 525.7, 527, 527.2, 527.8, 855–858

[56] References Cited

UNITED STATES PATENTS

| | | | |
|---|---|---|---|
| 182,355 | 9/1876 | Campbell | 137/527 |
| 555,588 | 3/1896 | Spencer | 137/525.7 |
| 2,782,777 | 2/1957 | Jasper | 137/525.3 X |
| 2,867,213 | 1/1959 | Thomas | 137/525.3 X |
| 3,626,148 | 12/1971 | Woytowich | 219/208 |
| 3,628,565 | 12/1971 | McWethy | 137/525.3 |

FOREIGN PATENTS OR APPLICATIONS

1,153,580  8/1963  Germany .................. 137/525.5

*Primary Examiner*—Robert G. Nilson
*Attorney, Agent, or Firm*—Stanley G. Ade

[57] ABSTRACT

A cylindrical valve body is secured within the body of the heater and includes a venturi inlet to reduce flow restrictions through the valve. A flexible flap valve spans the inner bore of the body at approximately 45° so that it only has to be moved through 45° to be fully opened or fully closed, and secured so that gravity aids in the seating of the flap valve in the closed position. A strip type retainer engages grooves in the side walls of a slot at the top of the body and engages the upper part of the flap valve and holds it in position when the valve assembly is incorporated in the heater and a projecting lug from the valve body engages an aperture in the heater body to position the valve assembly correctly relative to the heater assembly.

12 Claims, 6 Drawing Figures

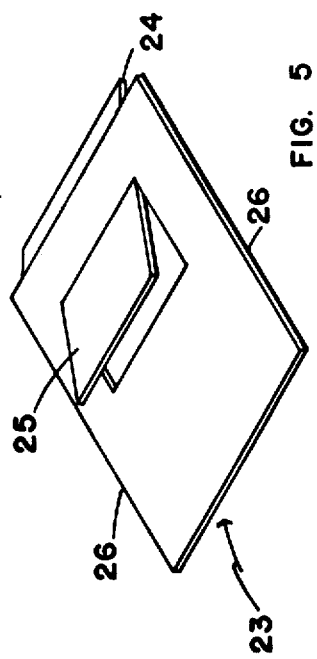
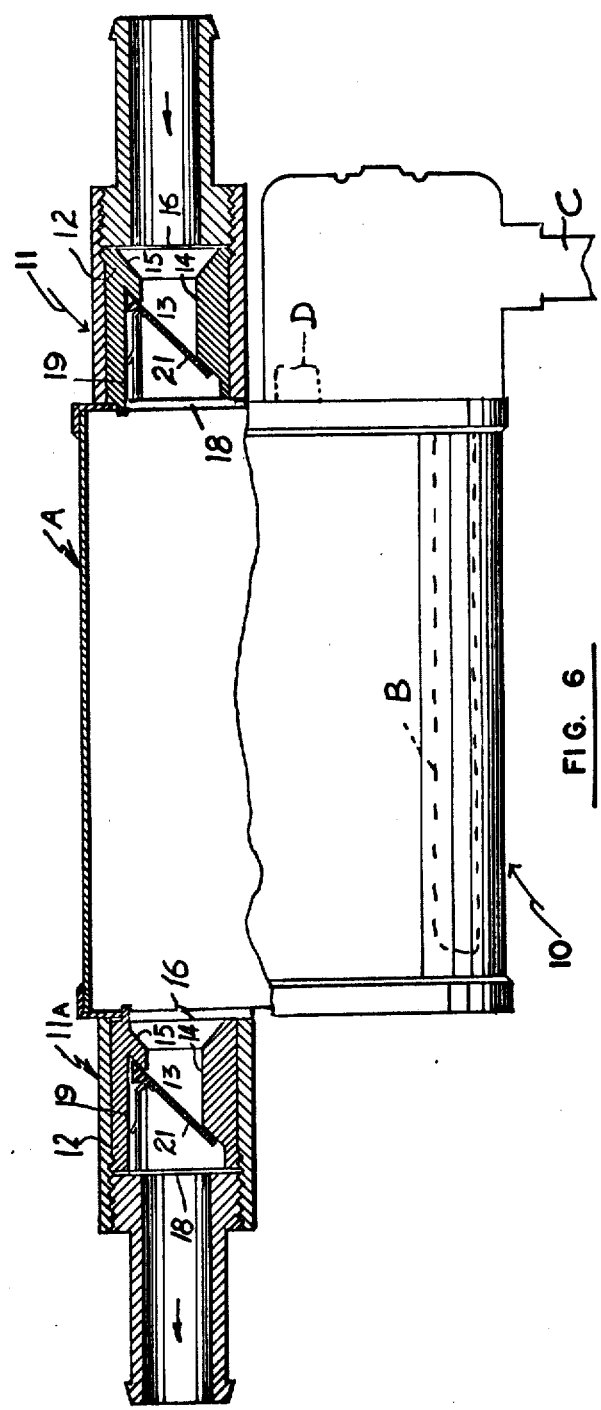

THERMAL PULSE TYPE HEATER AND VALVE THEREFORE

BACKGROUND OF THE INVENTION

This invention relates to new and useful improvements in one way valve assemblies adapted particularly for use in pulse type coolant heaters used in automobile engines and the like and constitutes a continuation-in-part application of my application, Ser. No. 608,876, filed Aug. 29th, 1975, now abandoned.

Conventionally these valves are one way ball valves or hinged flap valves which are not only expensive to manufacture but often leak due to the corrosive influence of the coolant passing through the valve.

SUMMARY OF THE INVENTION

A valve for use with a pulse type heater should satisfy the following design parameters:

a. It must be unaffected by heat up to 350° F, or the effects of a boiling solution of ethylene glycol and water.

b. It must open upon very light pressures, in the vicinity of an inch or less of water column.

c. It must close tightly upon reverse pressure, and withstand 15 – 20 p.s.i.g. without leakage or collapse.

d. It must be so designed that passage of solution through the valve makes it self-cleaning, so no foreign matter can accumulate to lessen its effectiveness.

e. It must be rapid in operation to develop the thermal pump principle to the utmost — hence a valve with minimum mass that opens fully with a 45° angular movement is superior to a non-loaded or spring-loaded ball, a spring-loaded poppet valve, or a mechanically hinged metal valve, or a non-metallic valve that requires 90° of angular motion to open fully.

f. It should be self-hinging — in other words, no mechanical sliding or angularly rotating parts, which may jam or corrode in service.

g. When installed in the recommended horizontal attitude for the assembled heater, gravity should tend to keep the valve closed, and this gravity effect should still exercise the above function even if the heater is tilted up to 30° off horizontal along its longitudinal axis.

The present invention satisfies these parameters as well as overcoming disadvantages inherent in conventional one way valve assemblies by providing a flexible flap valve normally situated at approximately 45° across the passageway on a valve seating when in the closed position. The flap valve is easily removed and replaced and is held in position by means of a small metal strip engaging one side of the valve.

The principal object and essence of the invention is to provide a one way valve assembly which includes a flexible one piece valve spanning the passageway of the valve housing when in the closed position and is moved to the open position by the fluid passing therethrough but returns to the closed position when flow in one direction ceases.

Another object of the invention is to provide a device of the character herewithin described in which the flap valve is situated obliquely or at an angle across the passageway when closed with the free side of the flap valve being downstream of fluid flow passageway so that it only has to move through approximately 45° to the fully opened position.

Another object of the invention is to provide a device of the character herewithin described which includes a venturi section in the upstream end of the passageway to reduce flow restriction through the valve housing.

Yet another object of the invention is to provide a device of the character herewithin described in which the valve assembly is preferably manufactured as a separate unit and assembled within the housing of the pulse type heater but which can, if desired, be incorporated directly in the construction of the heater body.

Still another object of the invention is to provide a device of the character herewithin described which includes means to ensure that the flap valve is positioned correctly with relation to the housing when assembled within the housing.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 5 is an isometric view of the retainer strip per se.

FIG. 6 is a cross sectional view of a pulse type heater showing the valve in position therein.

In the drawings like characters of reference indicate corresponding parts in the different figures.

DETAILED DESCRIPTION

Figure 1:
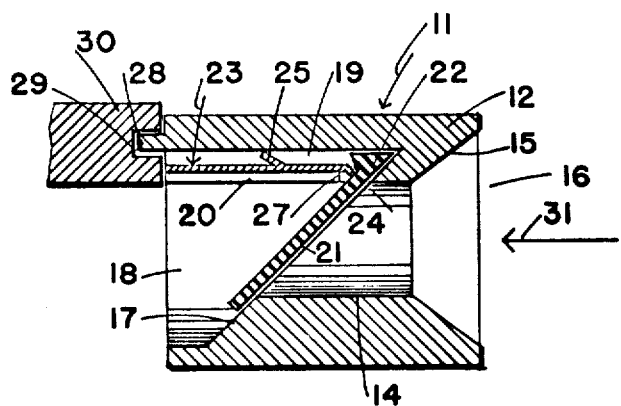
FIG. 1 is a longitudinal section of the valve assembly.
Figure 2:
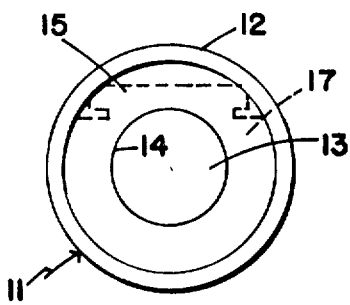
FIG. 2 is an end view of FIG. 1 taken from the right hand side thereof.
Figure 3:
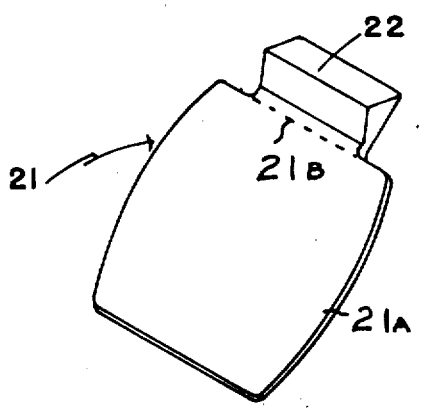
FIG. 3 is an isometric view of the flap valve per se.
Figure 4:
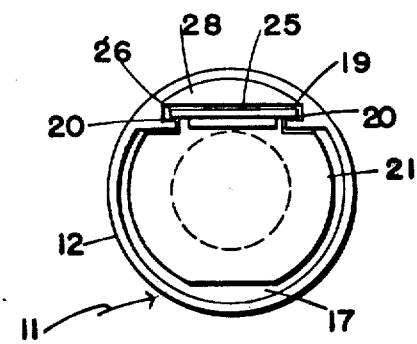
FIG. 4 is an end view taken from the left hand end of FIG. 1.

In the accompanying drawings, the valve assembly is shown as a separate item which can be assembled within the housing of a pulse type heater. A pulse type heater A having a heater element B connected to a source of line voltage through connectors C and controlled by a thermostat D. However, it will be appreciated that the valve assembly can be incorporated within the heater assembly body without departing from the spirit and scope of the present invention.

Proceeding therefore to describe the invention in detail, reference character 10 illustrates the body of a pulse type heater with an inlet valve assembly 11 and an outlet valve assembly 11A shown in position therein.

Each valve assembly is similar in construction and consists of a cylindrical housing 12 having a bore or passageway 13 formed therethrough and defined by the inner wall 14 of the housing 12.

A venturi section 15 is provided within one end of the bore 13 at the upstream end 16 of the housing and a valve seating 17 is formed part way through the bore or passageway 13 by enlarging the bore or passageway at the downstream end 18 thereof. Of importance is the fact that when the valve is in position and situated horizontally as illustrated, the valve seating extends obliquely around the bore or at an angle inclined from the vertical axis of the housing as clearly illustrated in FIG. 1.

A longitudinally extending slot 19 is formed within the portion of the wall situated at the upper side of the housing, said slot having inwardly positioned ledges 20 upon each side thereof.

The flap valve collectively designated 21 is preferably formed from flexible material such as silicone rubber and is substantially elliptical when viewed in front elevation to conform with the configuration of the inclined seating 17. An overhanging or "chin" portion 22 is formed at the upper side of the flap valve and this seats within the aforementioned slot 19 when positioned as illustrated.

A retainer or locking strip collectively designated 23 is substantially rectangular with a downturned inner end 24 and a small tang 25 extending upwardly as clearly illustrated in FIG. 5. When the flap valve is positioned as shown in FIG. 1, the retaining strip is engaged within the slot 19 with the edges 26 of the strip resting on the ledges 20. The downturned end 24 passes the inner ends 27 of the ledges and then moves downwardly to engage under the overhanging portion 22 of the flap valve thus holding it firmly in position. The tang 25, which is slightly resilient, forces the locking strip downwardly against the ledges 20 and holds the locking strip firmly into position as illustrated.

A small semi-circular projection 28 extends beyond the plane of the dowstream end 18 of the housing of the inlet valve 11 and of the upstream end 16 of the outlet valve 11A, and engages within a corresponding aperture or slot 29 formed within the wall 30 of the housing of the heater at either end respectively and these locate the valve assemblies in the correct position when same are assembled within the heater casing or housing prior to the heater being assembled.

This is to ensure that the flap valve is situated as illustrates so that gravity assists in maintaining the flap valve in the closed position against the seating 17.

In operation, fluid moves through the passageway 13 in the direction of arrow 31 moving the flap valve upwardly so that it lies parallel to the strip 23 and in this connection it will be observed that the flap valve only has to move through approximately 45° in order to move to the fully opened position.

In this regard the valve flexes along an imaginary hinge line between the main body portion 21A and the portion 22 and indicated by dotted line 21B.

The venturi section 15 reduces flow restriction of the fluid through the valve and fluid continues to flow thus maintaining the flap valve in the open position.

However, as soon as the flow ceases, the flap valve will move towards the closed position by gravity assisted by any back pressure which may exist at this time thus closing off the passageway firmly.

The locking strip 23 abuts against the housing 30 when the valve is in position as clearly shown in FIG. 1 thus assisting in maintaining the flap valve in the desired position as hereinbefore described.

The valve will open up with very light pressure and will close tightly upon reverse pressure. The movement of the valve is only 45° and gravity assists in the closing of the valve and in maintaining it closed.

Because the valve is manufactured of a light weight material and has a very low mass, the operation is rapid in both directions and with the minimum of flow differential.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A thermal type pulse heater comprising in combination a body portion, an electric heater element therein, an inlet fluid passageway and an outlet fluid passageway situated adjacent either end of said body portion and adjacent the upper side thereof respectively, a flexible flap valve in at least one of said passageways, a valve seat in the wall defining said one passageway, said flap valve extending across said one passageway occluding same when engaged with said valve seating and means detachably mounting said flap valve by one side thereof in said wall defining said one passageway, said last mentioned means including a retainer slot formed in the wall of said one passageway, a locking strip slidably engageable within said slot and engaging said flap valve by said one side thereof, overhanging means on said one side of said flap valve engaged by said locking strip and means to detachably retain said locking strip within said slot.

2. The assembly according to claim 1 in which said valve seating is inclined at an angle from the vertical axis of said passageway whereby one side of said flap valve is situated upstream and the other side of said flap valve is situated downstream when said flap valve is in the closed position and engaged upon said valve seating.

3. The assembly according to claim 2 which includes a venturi section in said passageway upstream of said valve seating.

4. The assembly according to claim 1 which includes a venturi section in said passageway upstream of said valve seating.

5. A one-way valve assembly for use in a pulse type water heater which includes a body portion; comprising in combination a fluid passageway, a flexible flap valve in said passageway, a valve seat in the wall defining said passageway, said flap valve extending across said passageway occluding same when engaged with said valve seating and means detachably mounting said flap valve by one side thereof in said wall defining said passageway, said means to detachably mount said flap valve including a retainer slot formed in the wall of said passageway, a locking strip slidably engageable within said slot and engaging said flap valve by said one side thereof, overhanging means on said one side of said flap valve engaged by said locking strip and means to detachably retain said locking strip within said slot.

6. The assembly according to claim 5 in which said valve seating is inclined at an angle from the vertical axis of said passageway whereby one side of said flap valve is situated upstream and the other side of said flap is situated downstream when said flap valve is in the closed position and engaged upon said valve seating.

7. The assembly according to claim 6 which includes a venturi section in said passageway upstream of said valve seating.

8. The assembly according to claim 5 which includes a venturi section in said passageway upstream of said valve seating.

9. A one-way valve assembly for pulse type heaters and the like comprising in combination a substantially cylindrical body portion, a fluid passageway formed therethrough, a flexible flap valve in said passageway, a valve seat in the wall defining said passageway, said flap valve extending across said passageway occluding same when engaged with said valve seating and means detachably mounting said flap valve by one side thereof in said wall defining said passageway, said means to detachably mount said flap valve including a retainer slot formed in the wall of said passageway, a locking strip slidably engageable within said slot and engaging said flap valve by said one side thereof, overhanging means on said one side of said flap valve engaged by said locking strip and means to detachably retain said locking strip within said slot.

10. The assembly according to claim 9 in which said valve seating is inclined at an angle from the vertical axis of said passageway whereby one side of said flap valve is situated upstream and the other side of said flap is situated downstream when said flap valve is in the closed position and engaged upon said valve seating.

11. The assembly according to claim 10 which includes a venturi section in said passageway upstream of said valve seating.

12. The assembly according to claim 9 which includes a venturi section in said passageway upstream of said valve seating.

* * * * *